US010402578B2

(12) United States Patent
Roth et al.

(10) Patent No.: US 10,402,578 B2
(45) Date of Patent: *Sep. 3, 2019

(54) MANAGEMENT OF ENCRYPTED DATA STORAGE

(71) Applicant: Amazon Technologies, Inc., Seattle, WA (US)

(72) Inventors: Gregory Branchek Roth, Seattle, WA (US); Gautam Shanbhag, Issaquah, WA (US); Gregory Alan Rubin, Seattle, WA (US); Christopher H. Fant, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/864,738

(22) Filed: Jan. 8, 2018

(65) Prior Publication Data

US 2018/0150646 A1    May 31, 2018

Related U.S. Application Data

(63) Continuation of application No. 14/622,752, filed on Feb. 13, 2015, now Pat. No. 9,864,874.

(Continued)

(51) Int. Cl.
*G06F 21/62* (2013.01)
*H04L 29/06* (2006.01)
(Continued)

(52) U.S. Cl.
CPC ...... *G06F 21/6218* (2013.01); *G06F 9/45558* (2013.01); *G06F 21/53* (2013.01);
(Continued)

(58) Field of Classification Search
CPC ............... G06F 21/6218; G06F 21/602; G06F 2009/45587; H04L 9/088; H04L 9/45533; H04L 9/0894
See application file for complete search history.

(56) References Cited

U.S. PATENT DOCUMENTS 7,260,820 B1 * 8/2007 Waldspurger ........... G06F 9/545
709/203
7,444,670 B2 * 10/2008 Berger .................... G06F 21/57
709/227

(Continued)

OTHER PUBLICATIONS

Agranat, R.D., Host Computing Device Management, U.S. Appl. No. 14/307,392, filed Jun. 17, 2014.

(Continued)

*Primary Examiner* — Robert B Leung
(74) *Attorney, Agent, or Firm* — Knobbe, Martens, Olson & Bear, LLP

(57) ABSTRACT

A data storage management process is directed to aspects of managing encrypted data via data storage volumes in conjunction with a service provider computer network that hosts virtual machine instances. A volume can be created and configured for managing encrypted data with an encrypted version of a volume key. The volume can be attached to a virtual machine instance such that the virtual machine instance accesses the volume in a transparent fashion based on the volume key. Encrypted data specific to the volume can be copied across multiple regions of data storage each associated with distinct encrypted versions of a volume key corresponding to the volume.

20 Claims, 12 Drawing Sheets

Related U.S. Application Data

(60) Provisional application No. 62/001,590, filed on May 21, 2014.

(51) Int. Cl.
  *H04L 9/08* (2006.01)
  *G06F 21/60* (2013.01)
  *G06F 21/53* (2013.01)
  *G06F 9/455* (2018.01)

(52) U.S. Cl.
  CPC ............ *G06F 21/602* (2013.01); *H04L 9/088* (2013.01); *H04L 9/0891* (2013.01); *H04L 9/0894* (2013.01); *H04L 63/10* (2013.01); *H04L 63/20* (2013.01); *G06F 2009/45579* (2013.01); *G06F 2009/45587* (2013.01)

(56) References Cited

U.S. PATENT DOCUMENTS

| | | | | |
|---|---|---|---|---|
| 8,498,417 | B1* | 7/2013 | Harwood | H04L 67/1097 380/277 |
| 8,594,335 | B1* | 11/2013 | Izhar | G06F 21/6218 380/277 |
| 9,189,609 | B1* | 11/2015 | Antony | G06F 9/45558 |
| 2004/0177247 | A1* | 9/2004 | Peles | H04L 63/08 713/155 |
| 2008/0082835 | A1* | 4/2008 | Asher | G06F 21/78 713/193 |
| 2009/0154709 | A1* | 6/2009 | Ellison | H04L 9/083 380/282 |
| 2009/0169012 | A1* | 7/2009 | Smith | G06F 21/57 380/277 |
| 2009/0238362 | A1* | 9/2009 | Kitani | G11B 7/00736 380/44 |
| 2009/0252330 | A1* | 10/2009 | Patnala | H04L 9/0822 380/279 |
| 2009/0282266 | A1* | 11/2009 | Fries | G06F 21/602 713/193 |
| 2010/0082991 | A1 | 4/2010 | Baldwin | |
| 2010/0086134 | A1* | 4/2010 | Ureche | G06F 21/80 380/277 |
| 2011/0016467 | A1* | 1/2011 | Kane | G06F 9/45558 718/1 |
| 2011/0029785 | A1* | 2/2011 | Foster | G06F 21/78 713/189 |
| 2011/0202765 | A1* | 8/2011 | McGrane | G06F 21/53 713/168 |
| 2011/0202916 | A1* | 8/2011 | VoBa | G06F 21/62 718/1 |
| 2012/0137098 | A1* | 5/2012 | Wang | G06F 3/0617 711/165 |
| 2012/0173882 | A1* | 7/2012 | Horn | G06F 21/78 713/189 |
| 2012/0246472 | A1* | 9/2012 | Berengoltz | G06F 11/1448 713/165 |
| 2012/0297206 | A1* | 11/2012 | Nord | G06F 21/602 713/193 |
| 2013/0227303 | A1* | 8/2013 | Kadatch | G06F 21/554 713/193 |
| 2013/0232329 | A1* | 9/2013 | Marinelli | G06F 21/80 713/2 |
| 2014/0074724 | A1* | 3/2014 | Gordon | G06Q 20/3829 705/71 |
| 2014/0208111 | A1* | 7/2014 | Brandwine | H04L 63/0428 713/171 |
| 2014/0258724 | A1* | 9/2014 | Lambert | H04L 63/062 713/170 |
| 2014/0281514 | A1* | 9/2014 | Erofeev | G06F 21/6218 713/165 |
| 2015/0019728 | A1* | 1/2015 | Suryanarayanan | G06F 9/452 709/225 |
| 2015/0178504 | A1* | 6/2015 | Nystrom | G06F 9/45533 713/2 |

OTHER PUBLICATIONS

Google Cloud Storage Now Provides Server-Side Encryption, http://googlecloudplatform.blogspot.com/2013/08/google-cloud-storage-now-provides.html, accessed Jan. 29, 2015, 8 pages.

Google Compute Engine, https://developers.google.com/compute/docs, accessed May 29, 2014, 209 pages.

* cited by examiner

US 10,402,578 B2

MANAGEMENT OF ENCRYPTED DATA STORAGE

This application is a continuation of U.S. patent application Ser. No. 14/622,752, entitled MANAGEMENT OF ENCRYPTED DATA STORAGE, and filed Feb. 13, 2015, which claims the benefit of U.S. Provisional Patent Application No. 62/001,590, entitled MANAGEMENT OF ENCRYPTED DATA STORAGE, and filed May 21, 2014, both of which are incorporated by reference herein in their entirety.

BACKGROUND

Data centers of remote network computing providers may house significant numbers of interconnected computing systems to provide computing resources to customers. Such data centers may provide network access, power, hardware resources (e.g., computing and storage), and secure installation facilities for hardware maintained by the data center, an organization, or by another third party.

To facilitate increased utilization of data center resources, virtualization technologies may allow a single physical computing machine to host one or more instances of virtual machines that appear and operate as independent computing machines to a connected computer user. With virtualization, the single physical computing device can create, maintain or delete virtual machines in a dynamic manner. In turn, users can request computing resources from a data center and utilize them in conjunction with virtual machine instances. Remote network computing providers generally strive to provide such resources with optimum levels of availability, convenience and security. More specifically, users may specify security protocols, such as encryption, for data maintained by a remote network computing provider on behalf of the user.

BRIEF DESCRIPTION OF THE DRAWINGS

The foregoing aspects and many of the attendant advantages will become more readily appreciated as the same become better understood by reference to the following detailed description, when taken in conjunction with the accompanying drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
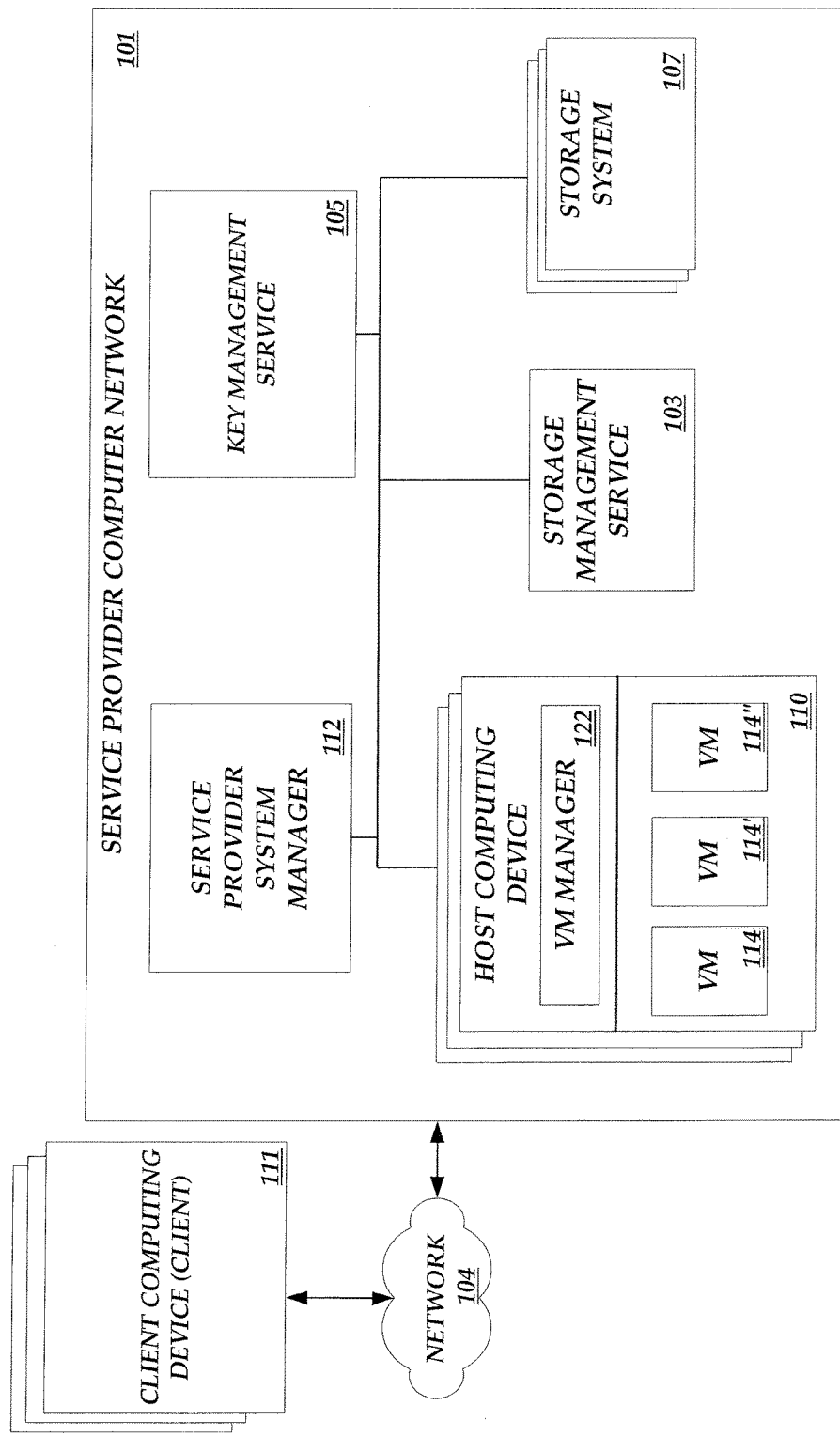
FIG. 1 is a block diagram illustrating an embodiment of a networked computing environment including a client computing device and a service provider computer network.

Generally described, the present disclosure is related to management of encrypted data with respect to data storage volumes ("volumes"), including block storage volumes and other types of volumes. More specifically, aspects of the present disclosure are directed to management of the encrypted data stored in volumes in conjunction with one or more virtual machine instances hosted by one or more physical computing devices. Illustratively, data utilized by, or created by, the virtual machine instances is encrypted and maintained without requiring encryption key management by the virtual machine instances or their associated customers. Accordingly, customers of a remote network service provider need only specify for the encryption of data on a volume.

One aspect of the disclosure is directed to configuration of a volume to receive and manage encrypted data. The volume can be set up independent of the encrypted data, and accordingly can be subject to various independent compression, indexing, or volume encryption operations. In one embodiment, a storage management service in a service provider network receives a request to create a volume for storing data in an encrypted form. The storage management service can allocate physical space for the volume according to information included in the request (e.g., factors corresponding to size, location, performance, or the like) and generate related volume metadata (e.g., volume id, volume pointers or logical paths, volume interface parameters, or the like). The volume is associated with a volume key for encrypting or decrypting data specific to the volume in which the encrypted data will be stored. For example, plaintext data associated with a virtual machine instance attached to the volume is encrypted by a process running on the host computing device according to the volume key and converted into corresponding ciphertext, which can then be written to the physical space allocated for the volume. In reverse, data read directly from the volume is in ciphertext form and will be decrypted by the process running on the host computing device using the volume key for utilization by the corresponding virtual machine instance.

For various security purposes, the storage management service that manages the volumes does not have access to the volume key used by the process on the host computing device to encrypt or decrypt data in accordance with this embodiment. Rather, the storage management service can obtain and maintain an encrypted volume key, which is a ciphertext version of the volume key. In some embodiments, the encrypted volume key can be generated by a key management service based on information specific to a customer associated with a virtual machine instance (e.g., a client key) and the volume metadata. In many instances, the storage management service does not access the volume key in plaintext form because data encryption/decryption based on the volume key is not performed by the storage management service. In some embodiments, the storage management service may perform various other services or functions, such as volume-based encryption operations independent of the encrypted data that are stored in the volume.

Another aspect of the disclosure is directed to the attachment of a volume configured for managing encrypted data to a virtual machine instance. In one embodiment, a software virtual machine manager implemented on host computing device that hosts the virtual machine serves as a bridging component between the virtual machine instance and the volume. Upon receipt of a request to attach the volume to the virtual machine instance, the virtual machine manager obtains an encrypted volume key corresponding to the volume, for example, from a storage management service in charge of the volume. The software virtual machine manager can also cause decryption of the encrypted volume key by the key management service under applicable policy that is enforced by the key management service.

Upon decryption of the encrypted volume key, the virtual machine manager obtains a plaintext volume key, which it can use to encrypt data that the virtual machine instance requests to write to the volume, and to decrypt data that the virtual machine instance requests to read from the volume. Because the data encryption/decryption occurs within the host computing device, no plaintext data will be communicated between the host computing device and the physical storage space corresponding to the volume. Also, the bridging functionality of the virtual machine manager is transparent to a customer operating the virtual machine instance such that the customer does not need to operate the virtual machine instance differently than attaching or otherwise managing a regular volume not configured for managing encrypted data.

Still another aspect of the disclosure is directed to copying data specific to a volume configured for managing encrypted data, across regions (e.g., data centers located in different geographic areas). In accordance with one embodiment, data storage management of a service provider network may include multiple regions each associated with distinct key management mechanisms for associating encrypted volume keys with volumes. Illustratively, a customer may be assigned different client keys or their functional equivalent in different regions. A volume may include portions across two or more regions, and encrypted volume keys may be generated based on client keys. Accordingly, a same volume corresponding to a specific volume key can be associated with different encrypted volume keys in different regions.

In addition, encrypted data specific to a volume can be copied or moved from one region to another, regardless of whether the volume is created in the region. For example, a file containing both an encrypted volume key corresponding to the volume and all the encrypted data currently stored in the volume can be generated. This file can be referred to as a snapshot of the volume, from which, the volume can be recovered or recreated in the same or a different region. Besides copying the encrypted data portion of a volume snapshot from a source region to a destination region, cross-region snapshot copy can require a mechanism for obtaining an encrypted volume key corresponding to the destination region. In accordance with one embodiment, a virtual machine manager or a storage management service in the service provider computer network obtains the source region encrypted volume key, causes decryption of the source region encrypted volume key based on source region client key, obtains plaintext volume key, and obtains a destination region encrypted volume key by causing encryption of the volume key based on destination region client key. The destination region encrypted volume key is then made available in the destination region. As such, the volume snapshot is copied from the source region to the destination region.

Although various aspects of the disclosure will be described with regard to illustrative examples and embodiments, one skilled in the art will appreciate that the disclosed embodiments and examples should not be construed as limiting.

FIG. 1 is a block diagram illustrating an embodiment of a networked computing environment 100 including one or more client computing devices ("clients") 111 in communication with a service provider computer network 101 through a communication network 104. The networked computing environment 100 may include different components, a greater or fewer number of components, and can be structured differently. For example, there can be more than one service provider computer networks 101 so that hosting services or data storage services can be implemented across the multiple service provider computer networks 101 based, for example, on established protocols or agreements. As another example, the service provider computer network 101 may include more or fewer components and some components may communicate with one another through the communication network 104.

Illustratively, the client 111 can be utilized by a customer of the service provider computer network 101, and can correspond to a wide variety of computing devices including personal computing devices, laptop computing devices, hand-held computing devices, terminal computing devices, mobile devices (e.g., mobile phones, tablet computing devices, electronic book readers, etc.), wireless devices, various electronic devices and appliances, and the like. In an illustrative embodiment, the client 111 includes necessary hardware and software components for establishing communications with various components of the service provider computer network 101 over the communication network 104, such as a wide area network or local area network. For example, the client 111 may be equipped with networking equipment and browser software applications that facilitate communications via the Internet or an intranet. The client 111 may have varied local computing resources such as central processing units and architectures, memory, mass storage, graphics processing units, communication network availability and bandwidth, etc. In one embodiment, the client 111 may have access to or control over a virtual machine instance hosted by the service provider computer network 101. The client 111 may also have access to data storage resources provided by the service provider computer network 101.

With continued reference to FIG. 1, according to one illustrative embodiment, the service provider computer network 101 may include interconnected components such as the service provider system manager 112, a key management service 105, one or more host computing devices 110, a storage management service 103 and one or more storage systems 107, having a logical association of one or more data centers associated with one or more service providers. The service provider system manager 112 may be implemented by one or more computing devices. For example, the service provider system manager 112 may be implemented by computing devices that include one or more processors to execute one or more instructions, memory, and communication devices to communicate with one or more clients 111 or other components of the service provider computer network 101. In some embodiments, the service provider system manager 112 is implemented on one or more back-end servers capable of communicating over a network. In other embodiments, the service provider system manager 112 is implemented by one or more virtual machines in a hosted computing environment. Illustratively, the service provider system manager 112 can facilitate or accomplish client interfacing and authentication, host computing device management, computation resource allocation and coordination, or other relevant functionalities disclosed herein.

The key management service 105 may also be implemented by one or more computing devices. In some embodiments, the key management service 105 is implemented on one or more computing devices capable of communicating over a network. In other embodiments, the key management service 105 is implemented by one or more virtual machines instances in a hosted computing environment. The key management service 105 may receive and respond to electronic requests to perform cryptographic operations, such as encryption of plaintext and decryption of ciphertext. The key management service may also maintain and manage keys, for example, for clients 111 who may remotely and programmatically configure and operate resources that are physically hosted by the service provider computer network 101. The keys managed by the key management service 105 may be securely managed so that clients, users and/or data services do not have access to the keys of others. For example, the key management service 105 may manage keys so that, for a client 111, other clients or services do not have access to the client's key(s) and are unable to cause the key management service 105 to use the client's key(s) to perform cryptographic operations.

In response to a request to perform a cryptographic operation, the key management service 105 may execute cryptographic operations that use the managed keys. Illustratively, the key management service 105 can select an appropriate key (e.g., a key managed for a client 111 associated with the request), perform the cryptographic operation using the selected key, and provide one or more results of the cryptographic operation in response to the received request. The key management service 105 can also produce an envelope key (e.g., a session key that is used to encrypt specific data items) and return the envelope key to the device or system invoking the cryptographic operations. The device or system can then use the envelope key to perform the cryptographic operation.

Further, the key management service 105 may facilitate configuration and management of policies for accessing keys. As one example, the key management service 105 may be associated with an interface module (not shown) which may enable a client 111 to view, create, update, or otherwise configure policies on keys associated with the client 111. A policy on a key may be information that, when processed by the key management service 105, is determinative of whether the key may be used in certain circumstances. A policy may, for instance, limit identities of clients, other devices and/or systems that are able to direct use of the key, limit times when the key can be used, limit data on which the key can be used to perform cryptographic operations, and provide other limitations. The policies may provide explicit limitations (e.g., who cannot use the keys) and/or may provide explicit authorizations (e.g., who can use the keys).

Policies may also be structured to generally provide conditions for when keys can and cannot be used. When a request to perform a cryptographic operation using a key is received, any policies on the key may be accessed and processed to determine if the request can, according to policy, be fulfilled. In some embodiments, the key management service 105 may provide audit records related to key usage and related policy changes to the client 111. For example, the audit records may include key usage details (e.g., for decryption or encryption, used by which entity, for what purpose, etc.) as well as detailed key access policy update history. For more example details on functionalities of the key management service 105, see U.S. patent application Ser. No. 13/764,963, entitled "DATA SECURITY SERVICE," filed on Feb. 12, 2013, which is incorporated by reference herein in its entirety.

Each host computing device 110 may be a physical computing device hosting one or more virtual machine instances 114. The host computing device 110 may host a virtual machine instance 114 by executing a software virtual machine manager 122, such as a hypervisor, that manages the virtual machine instance 114. The virtual machine instance 114 may execute an instance of an operating system and application software.

In some embodiments, host computing devices 110 may be associated with private network addresses, such as IP addresses, within the service provider computer network 101 such that they may not be directly accessible by clients 111. The virtual machine instances, as facilitated by the virtual machine manager 122 and service provider system manager 112, may be associated with public network addresses that may be made available by a gateway at the edge of the service provider computer network 101. Accordingly, the virtual machine instances 114 may be directly addressable by a client 111 via the public network addresses. One skilled in the relevant art will appreciate that each host computing device 110 would include other physical computing device resources and software to execute multiple virtual machine instances or to dynamically instantiate virtual machine instances. Such instantiations can be based on a specific request, such as a request from a client 111.

The storage management service 103 can be associated with one or more storage systems 107. The storage systems 107 may be servers used for storing data generated or utilized by virtual machine instances or otherwise provided by clients. Illustratively, the storage management service 103 can logically organize and maintain data in data storage volumes. For example, the storage management service 103 may perform or facilitate storage space allocation, input/output operations, metadata management, or other functionalities with respect to volumes.

In some embodiments, a volume may be distributed across multiple storage systems, may be replicated for performance purposes on storage systems in different network areas. The storage systems may be attached to different power sources or cooling systems, may be located in different rooms of a datacenter or in different datacenters, or may be attached to different routers or network switches.

In an illustrative embodiment, host computing devices 110 or storage systems 107 are considered to be logically grouped, regardless of whether the components, or portions of the components, are physically separate. For example, a service provider computer network 101 may maintain separate locations for providing the host and storage components. Additionally, the host computing devices 110 can be geographically distributed in a manner to best serve various demographics of its users. One skilled in the relevant art will appreciate that the service provider computer network 101 can be associated with various additional computing resources, such additional computing devices for administration of content and resources, and the like.

Figure 2:
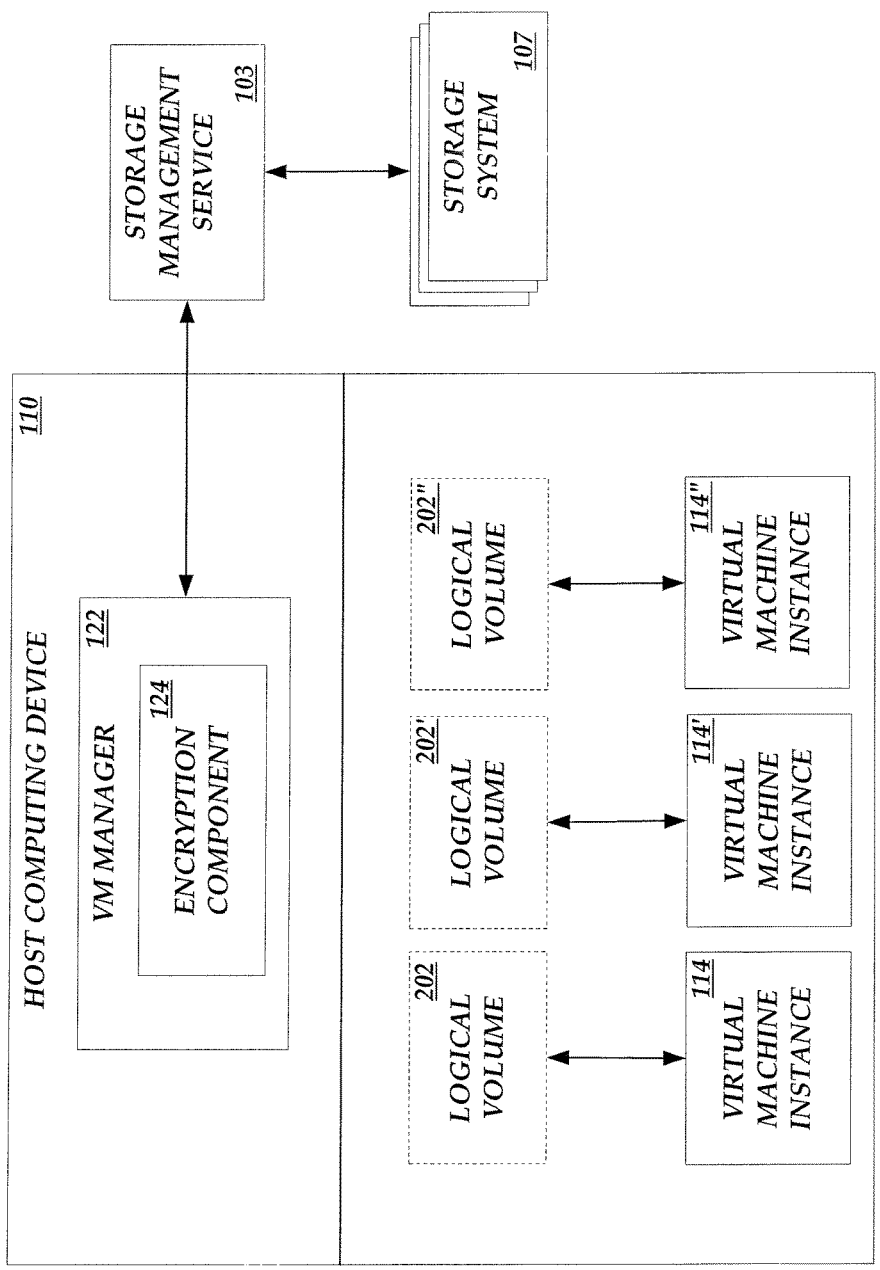
FIG. 2 is a block diagram illustrating example components of a host computing device utilized in accordance with the networked computing environment depicted in FIG. 1.

FIG. 2 is a block diagram illustrating example components of a host computing device 110 utilized in accordance with the networked computing environment 100 depicted in FIG. 1. As described earlier, each host computing device 110 may host one or more virtual machine instances, such as instances 114, 114' and 114". The virtual machine instances may or may not be associated with a same client.

As described above, the host computing device 110 may include a virtual machine manager 122. The virtual machine manager 122 may be software implemented on the same computer as the respective instances 114, 114' or 114". Illustratively, the virtual machine manager 122 tracks progress of the instances executed on the host computing device 110, monitors and facilitates the input/output of data from virtual instances to data storage devices or services, such as a storage management service 103, and communicates with other components of the service provider computer network 101 on various occasions (e.g., when assisting in volume key management.) In some embodiments, the virtual machine manager 122 may include an encryption component 124. Illustratively, the encryption component 124 may encrypt data to be written to logical volumes 202, 202' or 202", that are attached to their respective virtual machine instances 114, 114' or 114" based on corresponding volume keys available for use by the encryption component 124. In the reverse direction, the encryption component 124 may decrypt data read from a volume and forward the decrypted data to an appropriate virtual machine instance. In other words, the existence of encryption or decryption of data can be transparent to a virtual machine instance and its associated client.

With reference now to FIGS. 3-5D, the interaction between various components of the networked computing environment 100 of FIG. 1 will be illustrated. Specifically, FIGS. 3-5D illustrate, according to some embodiments, the interaction between various components of the networked computing environment 100 for the creation of a volume, attachment of a volume to a virtual machine instance, and copying of volume-specific data across regions. For purposes of the examples, however, the illustration has been simplified such that many of the components utilized to facilitate communications are not shown. One skilled in the relevant art will appreciate that such components can be utilized and that additional or different interactions can accordingly occur without departing from the spirit and scope of the present disclosure.

Figure 3:
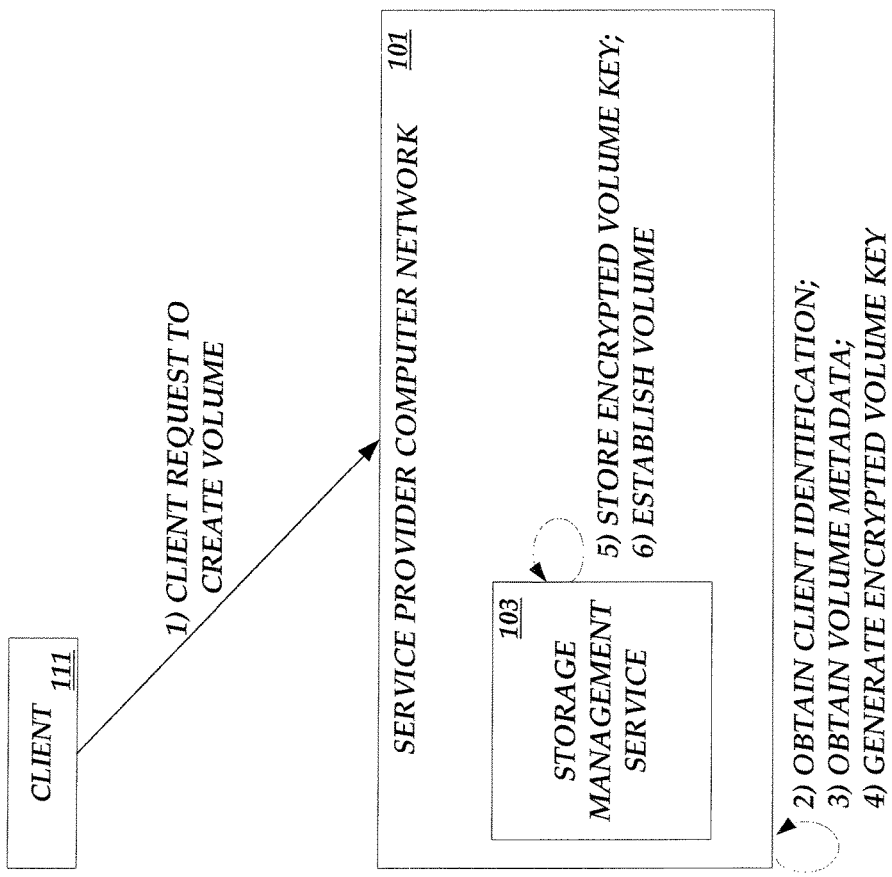
FIG. 3 is a simplified block diagram illustrating creation of a data storage volume in the networked computing environment of FIG. 1 according to one embodiment.

FIG. 3 is a simplified block diagram illustrating creation of a data storage volume in the networked computing environment 100 of FIG. 1 according an embodiment. As depicted in FIG. 3, at (1) a client 111 transmits a request to create and configure a volume for managing encrypted data to the service provider computer network 101. In some embodiments, the request to create a volume may be included in the client's request to initialize a virtual machine instance or included in the client's communications with the virtual machine instance. Illustratively, the request to create a volume may specify parameters or requirements related to the volume, such as a size of storage space requested, encryption/decryption method or parameters, data input/output performance requirements, etc. The request to create the volume may also include information related to an identification or authentication of the client 111.

At (2), the service provider computer network 101 obtains a client key specific to the client 111 for purposes of facilitating obtaining an encrypted volume key corresponding to the volume. In some embodiments, the client key is only available through a component of the service provider network 101, such as being maintained in a data store accessible only to the key management service 105. In some embodiments, the client key can be generated by another component of the service computer network 101.

At (3), the service provider computer network 101 obtains volume metadata corresponding to the volume. To achieve this, the service provider computer network 101 may request the storage management service 103 to communicate with associated storage systems and arrange for physical storage space for the volume. The volume metadata may include one or more volume identifiers, logical paths or pointers for accessing the allocated storage space, or the like. In many embodiments, the volume metadata may facilitate identification of the volume, encryption/decryption operations related to volume keys, or encrypted volume keys, etc.

At (4), the service provider computer network 101 generates an encrypted volume key corresponding to the volume based on at least a portion of the volume metadata and the client key or its functional equivalent. In some embodiments, this may be achieved by an Application Programming Interface (API) call between components of the service provider computer network 101. The API call may include an identifier to the client key or its functional equivalent, and a portion of the volume metadata, such as a volume identifier, as input parameters. The API call may also specify an encryption method or standard. In response to the API call, an encrypted volume key corresponding to the volume is generated by a component of the service provider computer network 101, such as the key management service 105, and transmitted to the storage management service 103.

At (5), the storage management service 103 stores the encrypted volume key in one or more data stores. In some embodiments, the encrypted volume key or volume metadata are stored separate from volume data of the volume. Illustratively, the encrypted volume key or volume metadata can be stored on separate storage systems. Alternatively, the encrypted volume key can be stored as part of volume record information in a dedicated data store that can only be accessed by the storage management service 103. Additionally, the stored encrypted volume keys can be indexed based on volume metadata to facilitate retrieval.

At (6), the storage management service 103 establishes the volume. In some embodiments, physical storage space is allocated on corresponding storage system(s) and certain volume metadata information, such as a volume identifier corresponding to the volume is transmitted to the client 111, or to a virtual machine instance associated with the client 111.

Figure 4A:
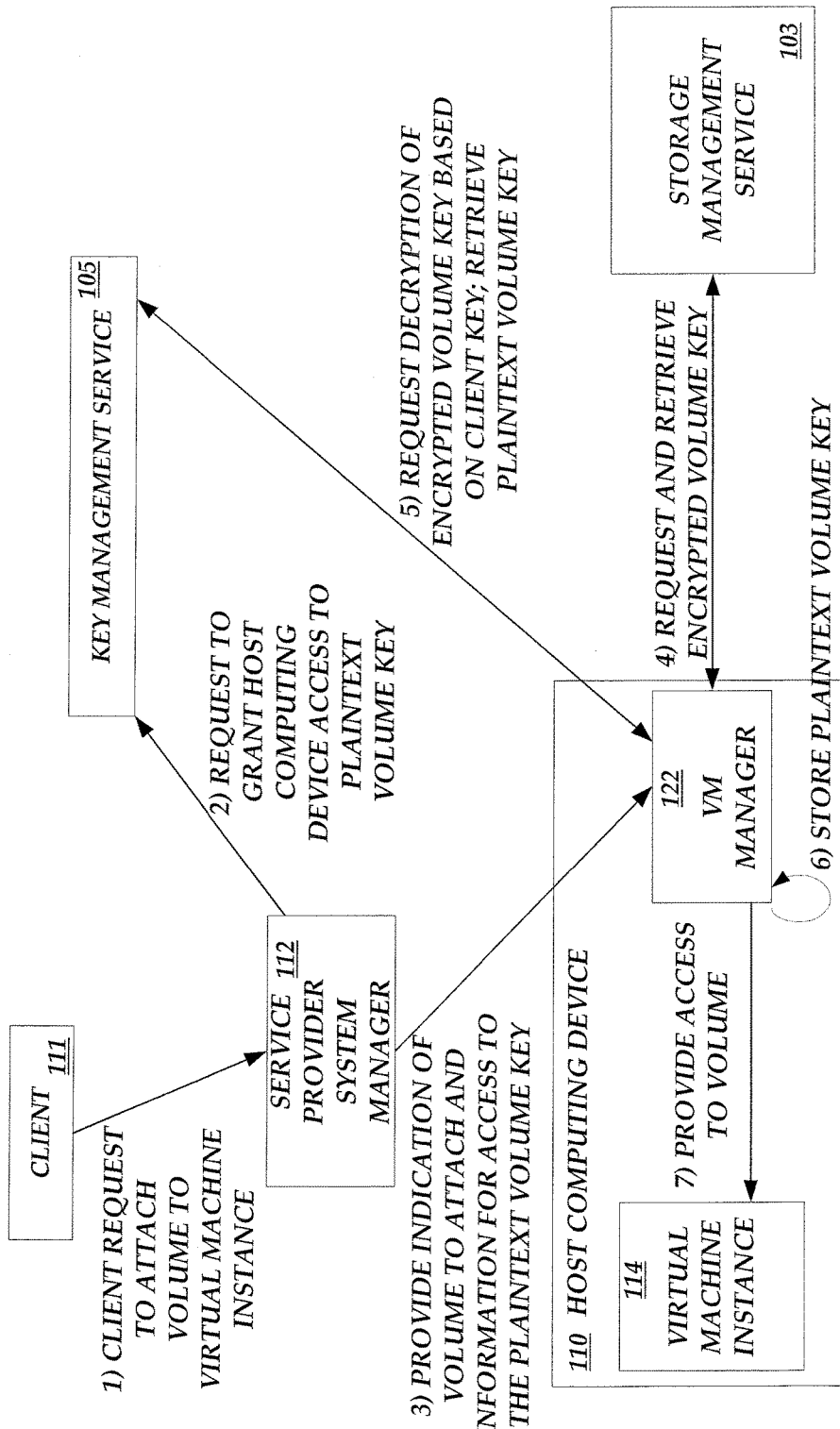
FIG. 4A is a simplified block diagram illustrating attachment of a data storage volume to a virtual machine instance in the networked computing environment of FIG. 1 according to one embodiment.

FIG. 4A is a simplified block diagram illustrating attachment of an encrypted data storage volume to a virtual machine instance in the networked computing environment 100 of FIG. 1 according to one embodiment. As depicted in FIG. 4A, at (1) a client 111 transmits a request to attach a volume configured for managing encrypted data to a virtual machine instance 114 executing on a host computing device 110. In some embodiments, the request is transmitted only to a service provider system manager 112. Alternatively, or in addition, the request can be transmitted to a virtual machine manager 122 corresponding to the host computing device 110. In some embodiments, the request to attach a volume may be included in the client's request to initialize the virtual machine instance 114 or included in the client's communications with the virtual machine instance 114. Illustratively, the request to attach a volume may include volume metadata corresponding to the volume, such as a volume identifier. The request to attach the volume may also include information related to an identification of the client 111 or authentication of the request (e.g., the request may be pre-signed by the client 111 with an electronic signature). For more example details on authentication of a request, see U.S. patent application Ser. No. 13/764,963, entitled "DATA SECURITY SERVICE," filed on Feb. 12, 2013, which is incorporated by reference herein in its entirety.

At (2), the service provider system manager 112 requests the key management service 105 to grant the host computing device 110 access to a plaintext volume key associated with the data storage volume. Illustratively, the service provider system manager 112 may transmit a request to the key management service 105 to create or update a policy for utilizing a client key associated with the client 111, so that the host computing device 110 is permitted to request decryption of an encrypted volume key associated with the data storage volume by the key management service 105 using the client key and that the host computing device 110 is also permitted to receive the plaintext volume key that resulted from the decryption. In some embodiments, the key management service 105 may request or allow the client 111 to select the client key from multiple keys associated with the client 111 for policy creation or updating. In some embodiments, the client key for usage by the host computing device 110 is owned by a second client. For example, the client key owned by the second client may be associated with an existing policy authorizing the requesting client 111 to make policy changes related to the usage of the client key for purposes of volume key encryption or decryption. In some embodiments, the policy specifies the permission for decrypting the encrypted volume key associated with the data storage volume based on volume metadata (e.g., a volume identifier) associated with the data storage volume. For example, the permission may specify that the host computing device 110 is permitted to request decryption of any encrypted volume key associated a volume identifier, using the client key.

It should be noted that the policy for utilizing the client key may be associated with an expiration time or condition, and may be further modified or revoked. For example, when the service provider system manager 112 receives a request to detach the volume from the virtual machine instance 114, the service provider system manager may revoke the policy for allowing the host computing device 110 to request decryption based on the client key. As described earlier, the client key may be maintained by and accessible only to the key management service 105. In some embodiments, the newly created or updated policy may permit the host computing device 110 to retrieve the client key for purposes of facilitating decryption of the encrypted volume key and obtaining a plaintext volume key corresponding to the volume.

In some embodiments, the policy updating or creation can be facilitated by policy tokens. For example, a policy token can be generated by the key management service 105 so as to encode or otherwise embody information related to permitted purposes or functionalities corresponding a respective policy. Illustratively, the key management service 105 may transmit at least the policy token to the service provider system manger 112 in response to the system manager 112's request for policy creation or update. An entity possessing the token may later request actions by the key management service 105 in accordance with corresponding permitted purposes or functionalities, such as, decryption of the encrypted volume key for a specific volume identifier.

At (3), the service provider system manager 112 provides indication of the data storage volume to be attached to the virtual machine instance 114 and information for access to the plaintext volume key to the virtual machine manager 122 that manages the virtual machine instance 114. For example, a volume identifier corresponding to the volume and an identification of the virtual machine instance 114 are transmitted to the virtual machine manager 122. Depending on one or more interfaces of the virtual machine manager 122, the data forwarded may need to be converted to a different format. In the embodiments where a policy token or another form of authorization is obtained from the key management service 105 for enforcing the newly created or updated policy, the policy token or another form of authorization may also be forwarded from the service provider system manager 112 to the virtual machine manager 122.

At (4), the virtual machine manager 122 requests and retrieves an encrypted volume key corresponding to the volume from a storage management service 103 that manages the volume. In some embodiments, the virtual machine manager 122 may include the volume identifier or other volume metadata corresponding to the volume in its request to the storage management service 103. In response to the request for encrypted volume key, the storage management service 103 can locate the encrypted volume key corresponding to the volume based, for example, on a search of volume records with the volume identifier of the volume, and transmit the encrypted volume key to the virtual machine manager 122.

At (5), the virtual machine manager 122 requests decryption of the encrypted volume key based on the client key associated with the client 111 and retrieves a plaintext volume key from the key management service 105. This can be accomplished by the virtual machine manager 122 making an API call to the key management service 105. Depending on embodiments, the API call may include the encrypted volume key, the policy token, an identifier of the client key or its functional equivalent, certain volume metadata, a credential of the host computing device 110, an identifier of the virtual machine instance 114, combinations of the same, or the like, as input parameters. In some embodiments, the virtual machine manager 122 may select a credential specific to the virtual machine instance 114 from a plurality of credentials of the host computing device 110, to be included in the API call, so as to comply with a policy enforced by the key management service 105.

Upon confirming that the API call conforms to an applicable policy (e.g., the newly created or updated policy permitting the host computing device 110 to obtain the decryption of the encrypted volume key), the key management service 105 performs the requested decryption and transmits to the virtual machine manager 122 a plaintext volume key for encrypting data to be written to the data storage volume and for decrypting data read from the volume.

At (6), the virtual machine manager 122 stores the plaintext volume key, for example, in a key data store 126. In some embodiments, the plaintext volume key is deleted from storage when the corresponding virtual instance 114 that the volume attaches to is terminated. At (7), the virtual machine manager 122 provides access to the volume to virtual instance 114. As described earlier, the virtual machine manager 122 may encrypt data that the virtual instance 114 is to write into the volume based on the plaintext volume key and forward the encrypted data to the storage management service 103 for writing to the storage space allocated for the volume. In the reverse direction, when requested by the virtual machine instance 114, the virtual machine manager 122 may decrypt data read from the volume based on the plaintext volume key and forward the decrypted data to the virtual machine instance 114. These operations can be transparent to the virtual machine instance 114 in that the virtual machine instance 114 views and transacts with the volume the same way as it does any regular volume not configured for managing encrypted data, for example, via the same data input/output APIs with the virtual machine manager 122.

Figure 4B:
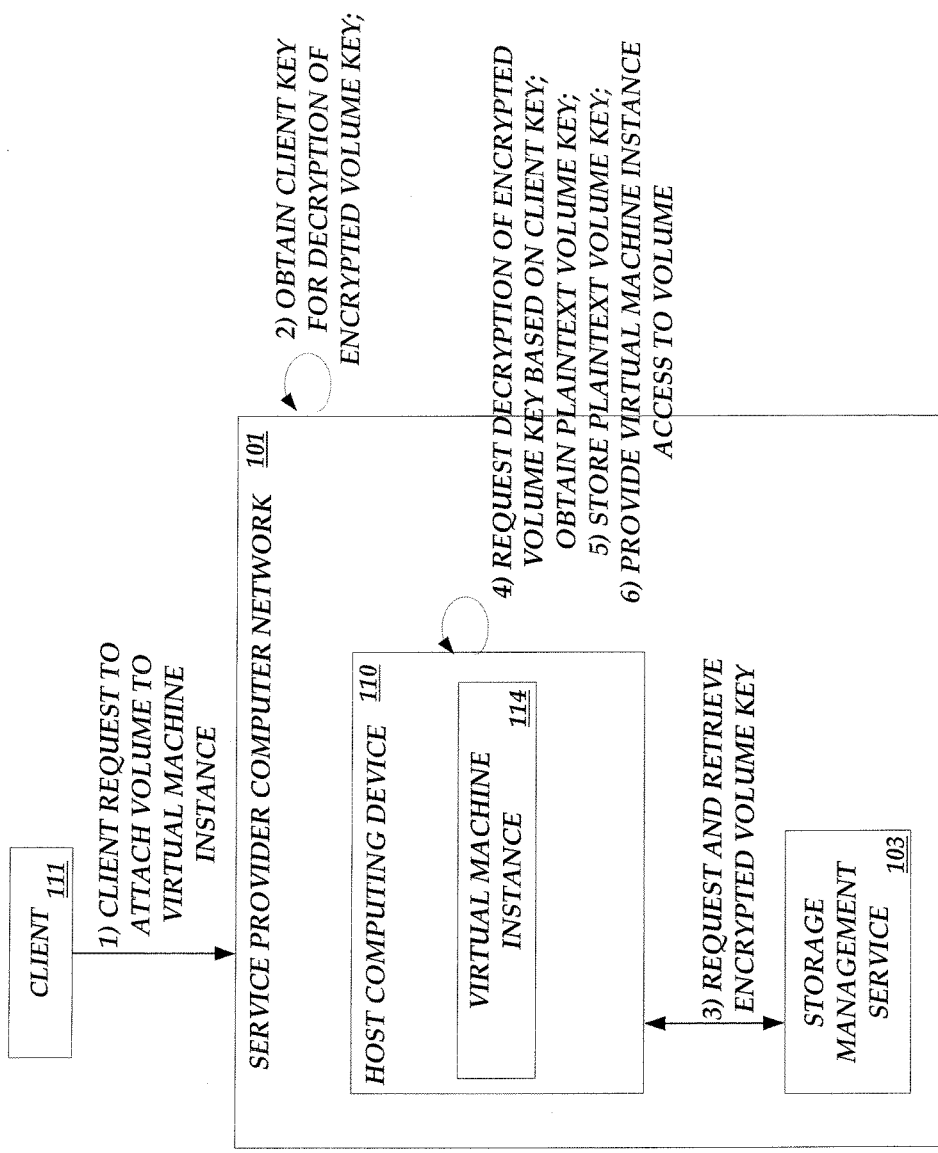
FIG. 4B is a simplified block diagram illustrating attachment of a data storage volume to a virtual machine instance in the networked computing environment of FIG. 1 according to another embodiment.

FIG. 4B is a simplified block diagram illustrating attachment of an encrypted data storage volume to a virtual machine instance in the networked computing environment 100 of FIG. 1 according to another embodiment. As depicted in FIG. 4B, at (1) a client 111 transmits a request to attach a volume configured for managing encrypted data to a virtual machine instance 114 executing on a host computing device 110. The request can be transmitted to one or more components of a service provider computer network 101. In some embodiments, the request to attach a volume may be included in the client's request to initialize the virtual machine instance 114 or included in the client's communications with the virtual machine instance 114. Illustratively, the request to attach a volume may include certain volume metadata corresponding to the volume, such as a volume identifier. The request to attach the volume may also include information related to an identification or authentication of the client 111.

At (2), the service provider computer network 101 obtains a client key specific to the client 111 for purposes of facilitating decryption of an encrypted volume key and obtaining a plaintext volume key corresponding to the volume. In some embodiments, the client key is available internally within one component of the service provider computer network 101, such as a key management service 105.

At (3), the host computing device 110 requests and retrieves an encrypted volume key corresponding to the volume from a storage management service 103 that manages the volume. In some embodiments, the virtual machine manager may include the volume identifier or other volume metadata corresponding to the volume in its request to the storage management service 103. In response to the request for encrypted volume key, the storage management service 103 can locate the encrypted volume key corresponding to the volume based, for example, on a search of volume records with the volume identifier of the volume, and transmit the encrypted volume key to the host computing device 110.

At (4), the host computing device 110 requests decryption of the encrypted volume key based on the client key or its functional equivalent and obtains a plaintext volume key. This can be accomplished by the host computing device 110 making an API call to another component of the service provider computer network 101, such as the key management service 105. In some embodiments, the host computing device 110 obtains credentials, policy tokens, or other authorizations to act on behalf of the client 111 or the virtual instance 114 when issuing the API call. The API call may include the encrypted volume key, client authorization information, and certain volume metadata as input parameters. In response, a plaintext volume key for encrypting data to be written to the volume and for decrypting data read from the volume is transmitted to the host computing device 110.

At (5), the host computing device 110 stores the plaintext volume key, for example, in a volatile memory accessible only to the host computing device 110. In some embodiments, the plaintext volume key is deleted from storage when the corresponding virtual instance 114 that the volume attaches to is terminated. At (6), the host computing device 110 provides access to the volume to virtual instance 114. As described earlier, the host computing device 110 may encrypt data that the virtual instance 114 is to write into the volume based on the plaintext volume key and forward the encrypted data to the storage management service 103 for writing to the storage space allocated for the volume. In the reverse direction, when requested by the virtual machine instance 114, the host computing device 110 may decrypt data read from the volume based on the plaintext volume key and forward the decrypted data to the virtual machine instance 114. These operations can be transparent to the virtual machine instance 114 in that the virtual machine instance 114 views and transacts with the volume the same way as it does any regular volume not configured for managing encrypted data, for example, via the same data input/output APIs with the host computing device 110.

Figure 5A:
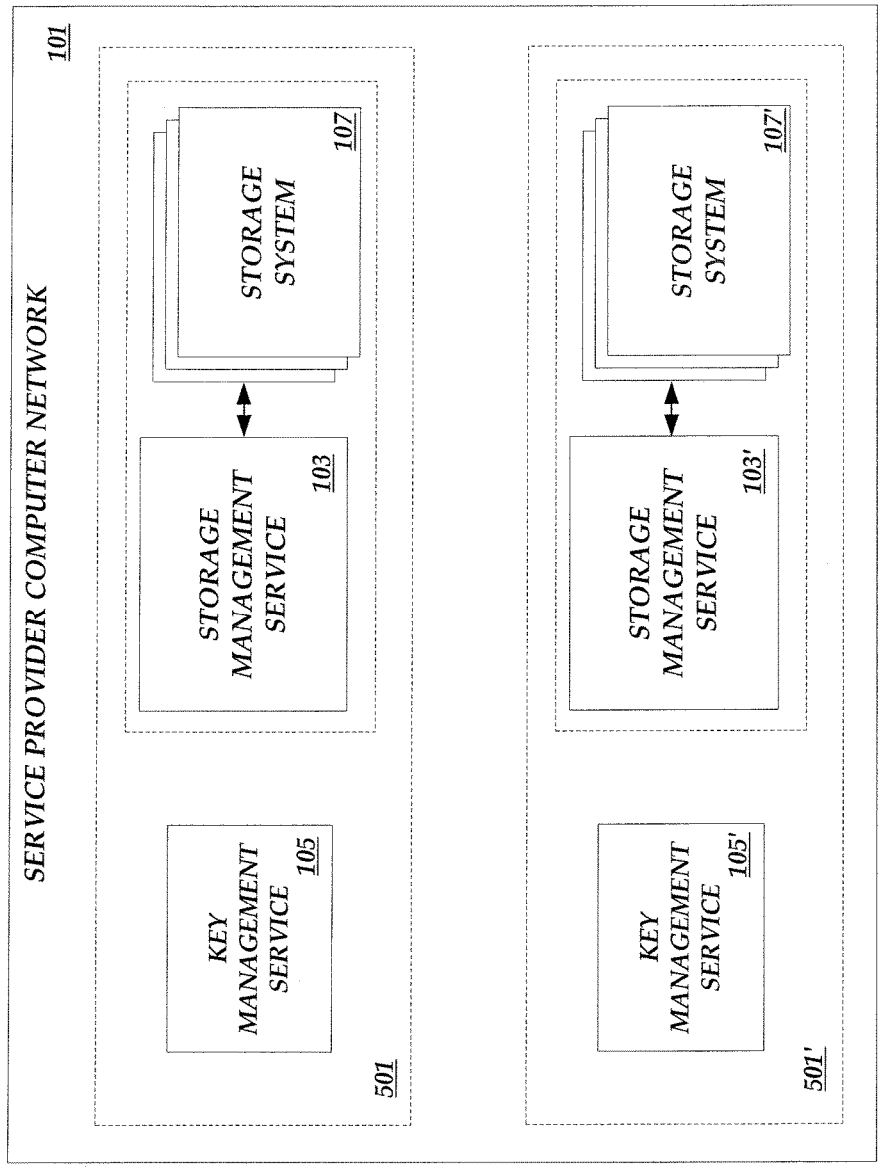
FIGS. 5A and 5B are simplified block diagrams illustrating two regions in the networked computing environment of FIG. 1 and corresponding volume-specific information in the two regions according to one embodiment.
Figure 5B:
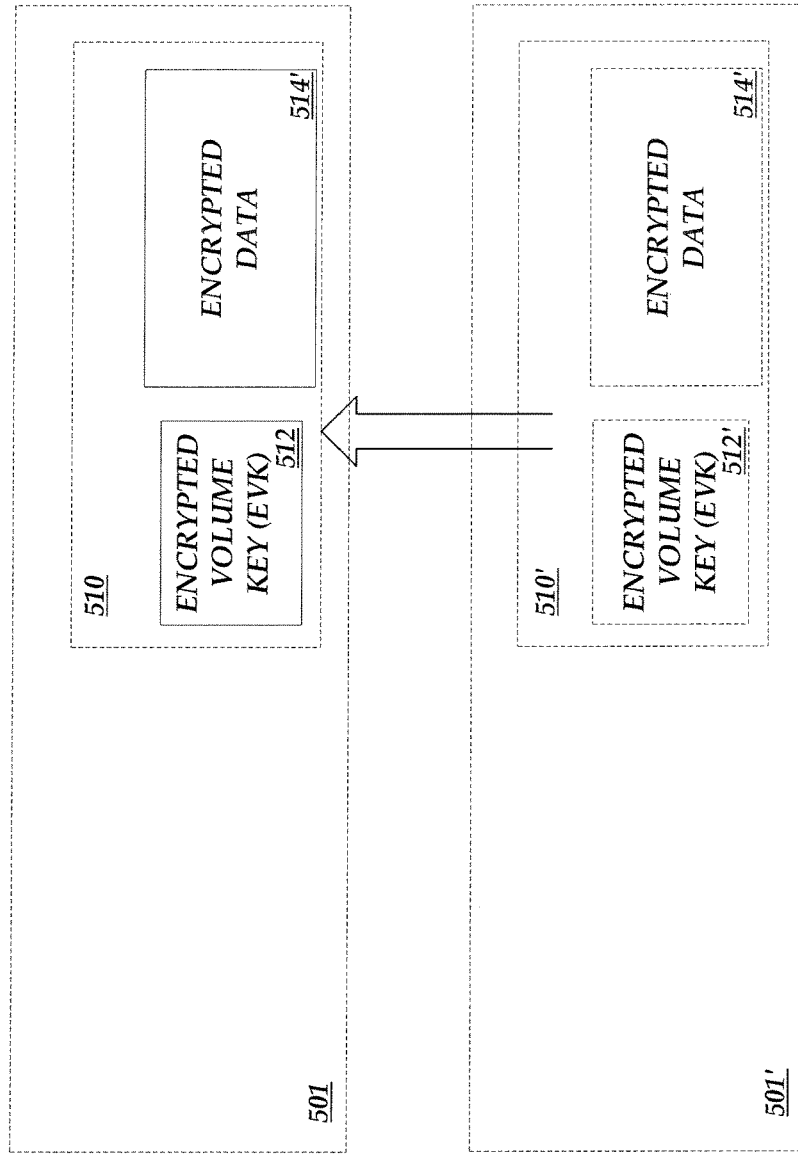

FIGS. 5A and 5B are simplified block diagrams illustrating two regions in the networked computing environment 100 of FIG. 1 and corresponding volume-specific information in the two regions according to one embodiment.

With reference to FIG. 5A, in some embodiments, a service provider computer network 101 may include multiple regions of storage services. For example, as depicted in FIG. 5A, a service provider computer network 101 includes regions 501 and 501', each further include their respective key management service 105 and 105', and respective storage management service 103 in connection with storage systems 107 and storage management service 103' in connection with storage systems 107'. Illustratively, regions can be defined based on geographic areas where a corresponding data center is located, requirements or capabilities associated with storage systems or corresponding management system, administrative or business policies, networking or computing requirements or constraints, data security or privacy concerns, or the like.

With reference to FIG. 5B, in some embodiments, a volume configured for managing encrypted data may correspond to different encrypted volume keys in different regions. This can occur in situations where the volume spans across multiple regions, or, when data of a volume is moved among different regions. It should be noted that the plaintext volume key corresponding to the volume may stay the same across regions so that data stored in the volume are encrypted consistently and can be copied or moved across regions without incurring additional decryption or encryption operations. For example, as depicted in FIG. 5B, a volume snapshot 510' stored in region 501' includes encrypted volume data 514' (in ciphertext) and corresponding encrypted volume key 512'. The encrypted volume key 512' can be decrypted in region 501' (e.g., by a key management service 105' of region 501') to reveal a plaintext volume key corresponding to the volume associated with data 514'. Illustratively, copying the snapshot 510' to region 501 (as a snapshot 510) can require copying encrypted volume data 514' to region 501 and obtaining another encrypted volume key 512 in accordance with the region 501. The encrypted volume key 512 can be decrypted in region 501 (e.g., by a key management service 105 of region 501) to reveal the same plaintext volume key corresponding to the volume associated with data 514'.

Figure 5C:
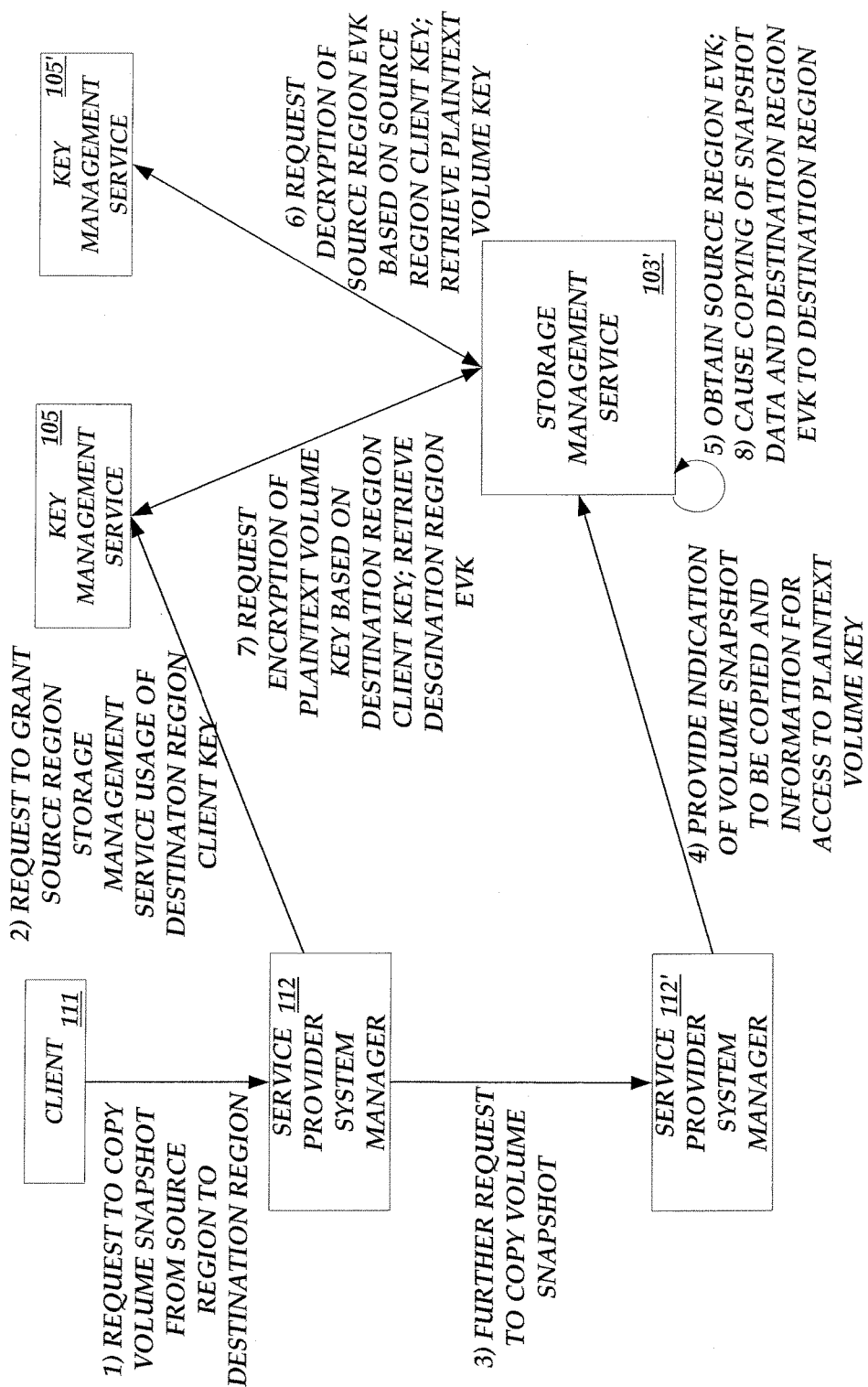
FIG. 5C is a simplified block diagram illustrating copying of volume-specific data from a source region to a destination region in the networked computing environment of FIG. 1 according to one embodiment.

With reference to FIG. 5C, interactions among components of the networked computing environment 100 are illustrated in accordance with one embodiment for copying a volume snapshot 510' from a source region 501' to a destination region 501.

As depicted in FIG. 5C, at (1) a client 111 transmits a request to copy the volume snapshot 510', from the source region 501' to the destination region 501. The request can be transmitted to a service provider system manager 112 associated with the destination region 501. Alternatively, or in addition, the request can be transmitted to a destination region storage management service 103 or a virtual machine manager 122 corresponding to a host computing device 110. In some embodiments, the request may be included in the client's request to initialize a virtual machine instance 114 or included in the client's communications with the virtual machine instance 114. In other embodiments, the request to migrate volume-specific data may be generated by the virtual machine instance 114 for various administrative, computational, or programming reasons. Illustratively, the request to migrate volume-specific data may include metadata corresponding to the volume-specific data, such as a volume identifier, data descriptions, or snapshot identification information. The request may also include information related to an identification of the client 111 or an authentication of the request. For example, the request may be electronically signed by the client 111 for authentication within the destination region. The request may also include pre-authenticated information, such as a pre-signed uniform resource locator ("pre-signed URL"), provided by the client 111, which can be used to prove authenticity of the request for snapshot copy to the source region.

At (2), the service provider system manager 112 requests the key management service 105 of the destination region 501 to grant an entity of the source region 501' (e.g., a storage management service 103') usage of a destination region client key managed by the destination region key management service 105. Illustratively, the service provider system manager 112 may transmit a request to the key management service 105 to create or update a policy for utilizing the destination region client key associated with the client 111, so that the source region storage management service 103' is permitted to request encryption of a plaintext volume key associated with the snapshot using the destination region client key managed by the key management service 105 and to receive a destination region encrypted volume key that resulted from the encryption. As described earlier, policy tokens embodying information corresponding to respective policies can be employed to facilitate the policy updating and enforcement. For example, a policy token resulting from the policy creation or updating may be eventually forwarded to the source region storage management service 103' for its use (e.g., as a parameter in an API request to the destination region key management service 105). In some embodiments, the created or updated policy may allow the source region storage management service 103 to request and retrieve the destination region client key for purposes of facilitating generation of a destination region encrypted volume key 512 corresponding to the volume snapshot.

At (3), the service provider system manager 112 associated with the destination region 501 communicates with a service provider system manager 112' associated with the source region 501' and transmits a further request for copying the snapshot from the source region 501' to the destination region 501. The further request may include information pre-authenticated by the client 111 to prove to the source region the authenticity of the requested snapshot copy. As described earlier, the pre-authenticated information may be a pre-signed request generated by the client 111, such as a pre-signed URL. The further request may also include an identification of the snapshot, a policy token to be utilized by the source region storage management service 103' for requesting operations to be performed by the destination region key management service 105.

In response to the further request, at (4), the source region service provider system manager 112' confirms the authenticity of the further request and provides to the storage management service 103' indication of the snapshot to be copied and information for accessing a plaintext volume key associated with the volume snapshot. For example, the service provider system manger 112' may cause policy updates to the source region key management service 105' and thereby permit the storage management service 103' to request decryption of a source region encrypted volume key associated with the volume snapshot using a source region client key managed by the source region key management service 105'. The service provider system manager 112' may also obtain a policy token corresponding to the updated policy and forward the token to the storage management service 105'.

At (5), the storage management service 103' requests and retrieves the source region encrypted volume key 512' corresponding to the snapshot 510' stored in the source region 501'. In some embodiments, the storage management service 103' can locate the encrypted volume key 512' associated with the snapshot 510' by parsing a predetermined structure of the snapshot 510'.

At (6), the storage management service 103' requests decryption of the source region encrypted volume key 512' based on the source region client key or its functional equivalent and retrieves the plaintext volume key from the key management service 105' of the source region 501'. Similar to what has been described earlier with respect to decryption of encrypted volume key in accordance with FIG. 4, this can be accomplished by the storage management service 103' making an API call to the source region key management service 105' in accordance with an applicable policy for utilizing the source region client key for decryption of the source region encrypted volume key. For example, the API call may include an applicable policy token or a credential of the storage management service 103', the source region encrypted volume key as well as an identification of the snapshot.

At (7), the storage management service 103' requests encryption of the plaintext volume key based on the destination region client key or its functional equivalent and retrieves a destination region encrypted volume key 512 corresponding to the volume. Similarly, the storage management service 103' can achieve this by making an API call to the key management service 105 of the destination region 501 in accordance with an applicable policy for utilizing the destination region client key for encryption of the plain text volume key. For example, the API call may include an applicable policy token or a credential of the storage management service 103', the plaintext volume key as well as an identification of the snapshot. In response to the API call, the destination region key management service 105 encrypts the plaintext volume key and transmits the resultant destination region encrypted volume key to the storage management service 103'. At (8), the storage management service 103' causes encrypted data 514' corresponding to the snapshot 510' to be copied from the source region 501' to the destination region 501. The storage management service 103' also provides the destination region encrypted volume key to the destination region 501, to be associated with the copied data 514' and thereby form a snapshot 510 in the destination region.

Figure 5D:
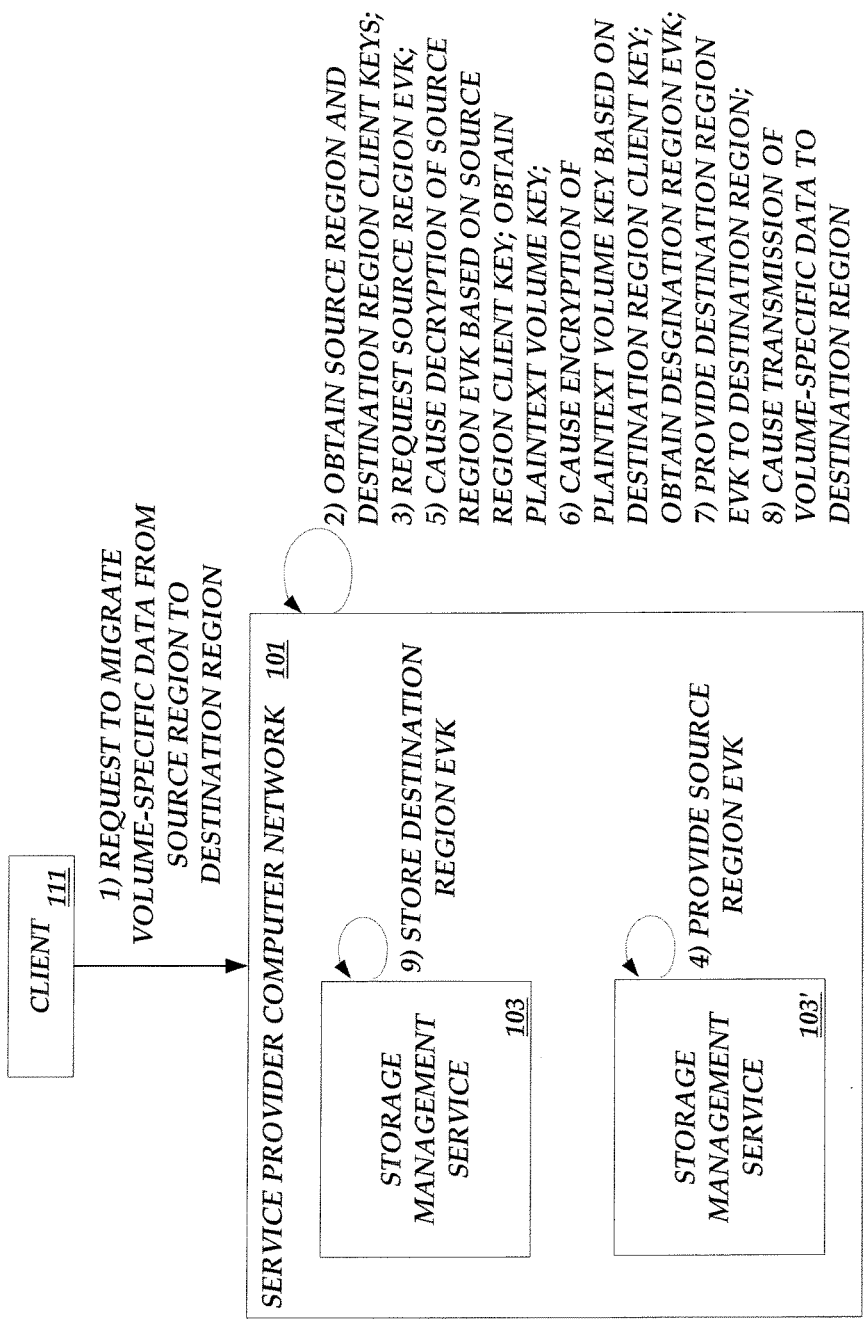
FIG. 5D is a simplified block diagrams illustrating copying of volume-specific data from a source region to a destination region in the networked computing environment of FIG. 1 according to another embodiment.

FIG. 5D is a simplified block diagrams illustrating migration of volume-specific data 514' from a source region 501' to a destination region 501 in the networked computing environment 100 of FIG. 1 according to another embodiment. The volume-specific data 514' may or may not be included in a volume snapshot.

As depicted in FIG. 5D, at (1) a client 111 transmits a request to migrate volume-specific ciphertext data 514', from the source region 501' to the destination region 501. The request can be transmitted to one or more components of a service provider computer network 101. In some embodiments, the request to migrate volume-specific data may be included in the client's request to initialize the virtual machine instance 114 or included in the client's communications with the virtual machine instance 114. In other embodiments, the request to migrate volume-specific data may be generated by the virtual machine instance 114 for various administrative, computational, or programming reasons. Illustratively, the request to migrate volume-specific data may include metadata corresponding to the volume-specific data, such as a volume identifier, data descriptions, or snapshot identification information. The request may also include information related to an identification or authentication of the client 111.

At (2), the service provider computer network 101 obtains a source region client key specific to the client 111 for purposes of facilitating decryption of a source region encrypted volume key 512' corresponding to the volume-specific data 514' and obtains a destination region client key specific to the client 111 for purposes of facilitating generation of a destination region encrypted volume key 512 corresponding to the volume-specific data 514'. In some embodiments, the source region and client region client keys are available or can be generated internally within respective components of the service provider computer network 101 in the two regions, such as key management services 105' and 105.

At (3), the service provider computer network 101 requests a source region encrypted volume key 512' corresponding to the volume from a storage management service 103' in the source region 501'. At (4), the storage management service 103' can provide the source region encrypted volume key. In some embodiments, the storage management service 103' can locate the encrypted volume key 512' corresponding to the volume based, for example, on a search of volume records with the volume identifier of the volume. In the case of migrating a volume snapshot, the storage management service 103' can locate the encrypted volume key 512' associated with the snapshot 510'.

At (5), the service provider computer network 101 causes decryption of the source region encrypted volume key 512' based on the source region client key or its functional equivalent and obtains a plaintext volume key. Similar to what has been described earlier with respect to decryption of encrypted volume key in accordance with FIGS. 4A and 4B, this can be accomplished by an API call from one component to another within the service provider computer network 101. For example, the API call can be directed to the key management service 105' of the source region 501'. At (6), the service provider computer network 101 causes encryption of the plaintext volume key based on the destination region client key or its functional equivalent and retrieves a destination region encrypted volume key 512 corresponding to the volume. Similarly, this can be achieved via an API call between components of the service provider computer network 101. For example, the API call can be directed to the key management service 105 of the destination region 501.

At (7), the service provider computer network 101 provides the destination region encrypted volume key to the destination region 501. The destination region encrypted volume key can be forwarded to the storage management service 103 of the destination region. At (8), the service provider computer network 101 causes transmission of volume-specific data 514' from the source region 501' to the destination region 501 by, for example, an API call to the storage management service 103' in the source region 501'. At (9), the storage management service 103 of the destination region 501 stores the destination region encrypted volume key. For example, the storage management service 103 can store the destination region encrypted volume key 512 in its volume records, or, store the destination region encrypted volume key in a volume snapshot comprising the data 514' received in the destination region 501.

Figure 6:
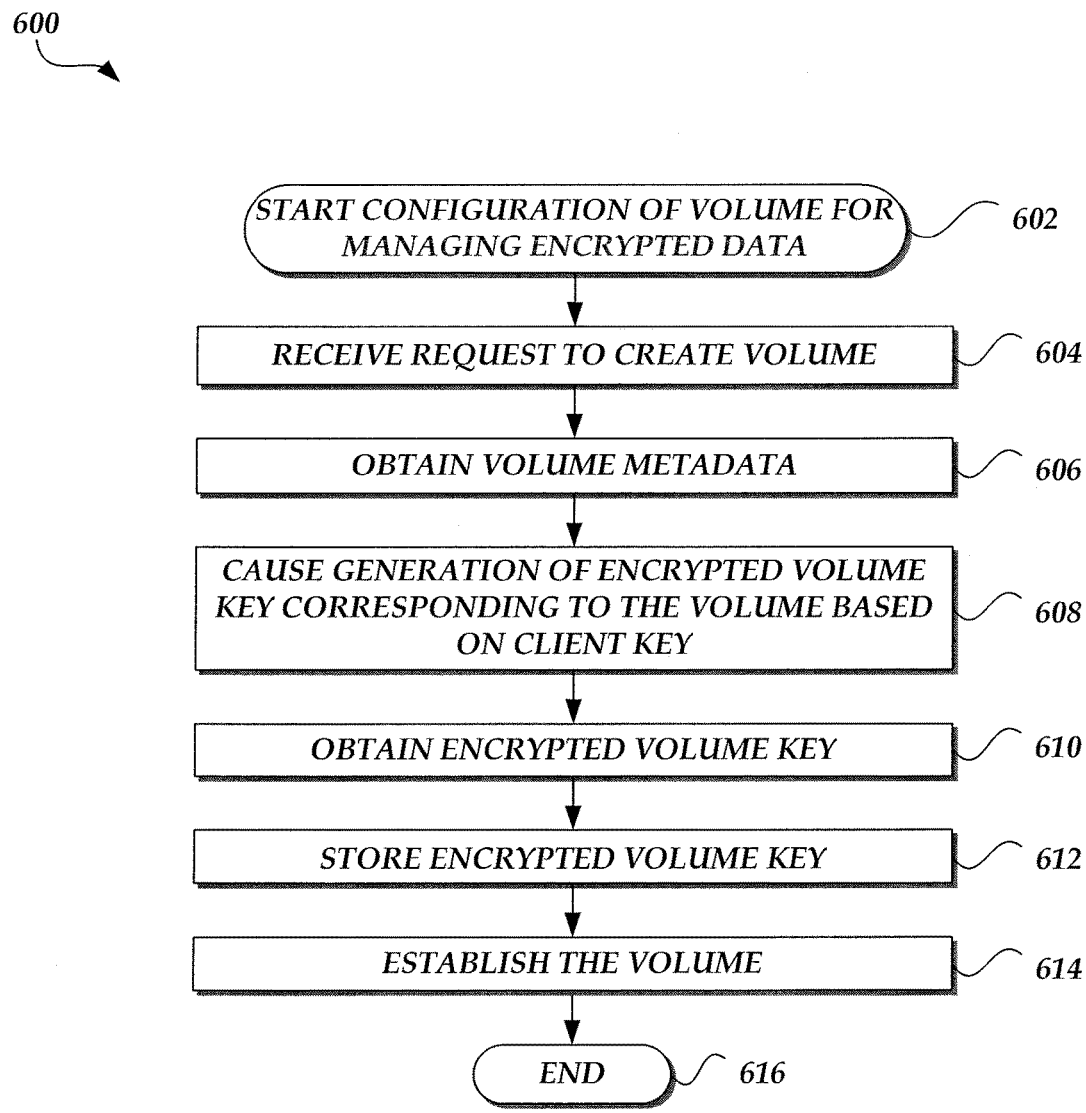
FIG. 6 is a flow diagram of an illustrative data storage volume creation process.

FIG. 6 is a flow diagram of an illustrative encrypted data storage volume creation process 600, which can be implemented by one or more components of a service provider computer network 101, such as a storage management service 103, a service provider system manager 112, a host management service 102, a virtual machine manager 122 of a host computing device 110 or other components that can be envisioned by a person of skill in relevant art, depending on the architectural design of the service provider computer network 101.

As depicted in FIG. 6, routine 600 starts at block 602. At block 604, a request is received to create and configure a volume for managing encrypted data. Illustratively, the request may specify parameters or requirements related to the volume, such as a size of storage space requested, encryption/decryption method or parameters, data input/output performance requirements, etc. The request may also include information related to an identification or authentication of a client associated with the volume. For example, the request may indicate which client or virtual machine instance may have access to the volume. The request may further include information related to a virtual machine instance, to which the volume can be attached. At block 606, volume metadata corresponding to the volume is obtained. At least part of the volume metadata can be obtained from the request itself, or can be generated or derived from the storage management service 103 or its associated storage systems.

At block 608, a client key or its functional equivalent is used for generation of an encrypted volume key corresponding to the volume. A client key can be a unique identifier of the client with respect to data storage in the service provider computer network 101, which may or may not be explicitly retrievable by the client. For example, a key management service 105 can manage client keys internally and provide a set of APIs for performing client key related operations such as encryption or decryption with respect to encrypted volume keys. The key management service 105 can be configured to perform client key related operations in accordance with client key management policies established by a client who requested to create the volume. For example, the client key management policies can be derived from the volume access related information included in the request to create the volume. A functional equivalent of the client key can be a form of credential or authorization of the client, which can facilitate operations related to the client keys. As described earlier, a functional equivalent of the client key can be associated with an expiration time or limitations of functionalities.

At block 610, the encrypted volume key is obtained based on volume metadata and the client key. For example, the volume metadata and the client key or its functional equivalent can be input of an API call to the key management service 105, which generates the encrypted volume key based on an encryption algorithm with a portion of the volume metadata (e.g., a volume identifier) and the client key as parameters. In some embodiments, encrypted volume keys are highly available and are uniquely mapped to a combination of the portion of the volume metadata and the client key so that there are no duplicate encrypted volume keys corresponding to different volumes. In some embodiments, the key management service 105 can perform the client key related operations, such as generating the encrypted volume keys, based on appropriate API calls from another entity in accordance with an applicable policy to use the client key. In these embodiments, the encrypted volume key can be obtained without obtaining an explicit client key.

There may exist multiple encrypted volume keys corresponding to the same volume. The multiple encrypted volume keys which may have resulted from multiple API calls to the key management service 105 on different occasions. For example, a different encrypted volume key can be generated when re-encryption of volume keys are required under certain security management policies. In this example, an existing encrypted volume key corresponding to the volume may be decrypted, and the resulting plaintext volume key may be encrypted again to generate a new encrypted volume key, which is a different in ciphertext than the existing encrypted volume key. This newly generated, different encrypted volume key can then be made available to the storage management service 103.

At block 612, the encrypted volume key is stored. As described earlier, in some embodiments, the encrypted volume key and/or volume metadata are stored separate from data of the volume. Illustratively, they can be stored on separate storage systems. Alternatively, the encrypted volume key can be stored as part of volume record information in a dedicated data store that can only be accessed by the storage management service 103. The encrypted volume keys as stored can be indexed based on volume metadata to facilitate their retrieval.

At block 614, the volume is established. In some embodiments, volume metadata information, such as a volume identifier corresponding to the volume is transmitted to other components of the service provider computer network 101, such as the service provider system manager 112, a virtual machine instance 114, or to the client 111. Additionally, storage space for the volume is allocated in accordance with the volume metadata, for example, under management of the storage management service 103. Routine 600 ends at block 616.

Figure 7:
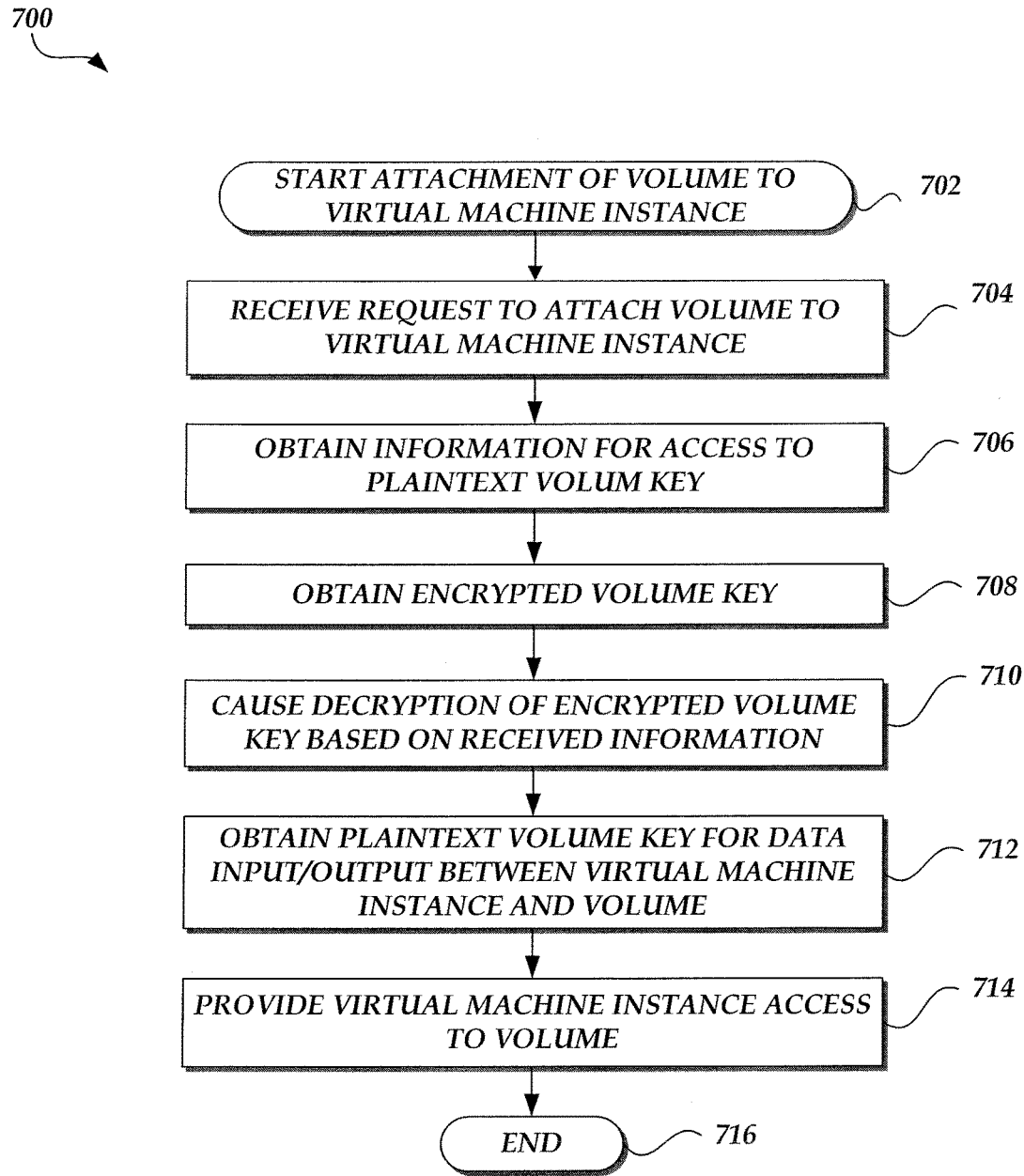
FIG. 7 is a flow diagram of an illustrative process to attach a data storage volume to a virtual machine instance.

FIG. 7 is a flow diagram of an illustrative process 700 to attach an encrypted data storage volume to a virtual machine instance 114. Routine 700 can be implemented by one or more components of a service provider computer network 101, such as a virtual machine manager 122 of a host computing device 110 that hosts the virtual machine instance 114, a service provider system manager 112, a storage management service 103, or other components that can be envisioned by a person of skill in relevant art, depending on the architectural design of the service provider computer network 101.

As depicted in FIG. 7, routine 700 starts at block 702. At block 704, a request is received to attach a volume configured for managing encrypted data to the virtual machine instance 114. Illustratively, the request to attach the volume may include volume metadata corresponding to the volume, such as a volume identifier. The request to attach the volume may also include information related to an identification of a client 111 associated with the virtual machine instance 114 or an authenticity of the request. The request may also include a pre-signed request by a client for decrypting an encrypted volume key associated with the volume.

In some embodiments, the request to attach a volume may correspond to a system recovery event. For example, a host computing device 110 that hosts the virtual machine instance 114 may incur a power loss and may be subsequently rebooted. In this case, previously attached volumes may need to be automatically reattached. The host computing device 110 or a virtual machine manager 122 may determine instances that are still executing on the host computing device 110 by, for example, contacting the service provider system manager 112 or another component of the service provider network 101. The host computing device 110 or the virtual machine manager 122 may also obtain a list of volumes that are supposed to be attached to each virtual machine instance hosted by the host computing device 110, for example, by accessing a non-volatile memory associated with the host computing device 110 where such information is maintained. Based on these information, appropriate requests can be generated for re-attaching volumes to the virtual machine instances. It should be noted that policies, if any, that are enforced by a key management service 105 for permitting the host computing device 110 to request decryption of respective encrypted volume keys corresponding to the volumes to be reattached may remain valid after the rebooting of the host computing device 110.

At block 706, information for access to a plaintext volume key corresponding to the volume is obtained. As previously described, the information may include a policy token that encodes or otherwise embodies information corresponding to an applicable policy regarding the usage of a client key associated with the client 111. The information may instruct the host computing device 110 or its virtual machine manager 122 to select a credential identifying the host computing device 110, the virtual machine instance 114, or their combination in some form.

At block 708, an encrypted volume key corresponding to the volume is obtained. In some embodiments, the encrypted volume key can be obtained by sending a request to the storage management service 103 that manages the volume. Volume identifier or other volume metadata corresponding to the volume can be included in this request to the storage management service 103. In response to the request for encrypted volume key, the storage management service 103 can locate and provide the encrypted volume key corresponding to the volume based, for example, on a search of volume records with the volume identifier of the volume.

At block 710, decryption of the encrypted volume key based on the client key is caused to be performed. As described earlier, this can be accomplished by making an applicable API call to the key management service 105, with an explicit client key, policy token, a credential of the host computing device or virtual machine, etc., as an input parameter, depending on various embodiments. The applicable API call may specify an applicable decryption algorithm. Accordingly, the decryption can be achieved by the key management service 105 running the algorithm with the encrypted volume key, the client key, and possibly other relevant parameters such as volume metadata, as inputs. At block 712, a plaintext volume key for data input/output between the virtual machine instance 114 and the volume is obtained. The plaintext volume key can be provided by the key management service 105 in response to the applicable API call for decryption of the encrypted volume key.

At block 714, access to the volume is provided to the virtual machine instance 114. In some embodiments, the plaintext volume key is obtained and stored by the virtual machine manager 122 for encrypting data before they are written to the volume and for decrypting data read from the volume. In some embodiments, the plaintext volume key is stored on a volatile memory accessible to the virtual machine manager 122, so that the plaintext volume key does not persist on any storage space. As described earlier, the virtual machine manager 122 may encrypt data that the virtual instance 114 is to write into the volume based on the plaintext volume key and forward the encrypted data to the storage management service 103 for writing to the storage space allocated for the volume. In the reverse direction, when request by the virtual machine instance 114, the virtual machine manager 122 may decrypt data read from the volume based on the plaintext volume key and forward the decrypted data to the virtual machine instance 114. Routine 700 ends at block 716.

Figure 8:
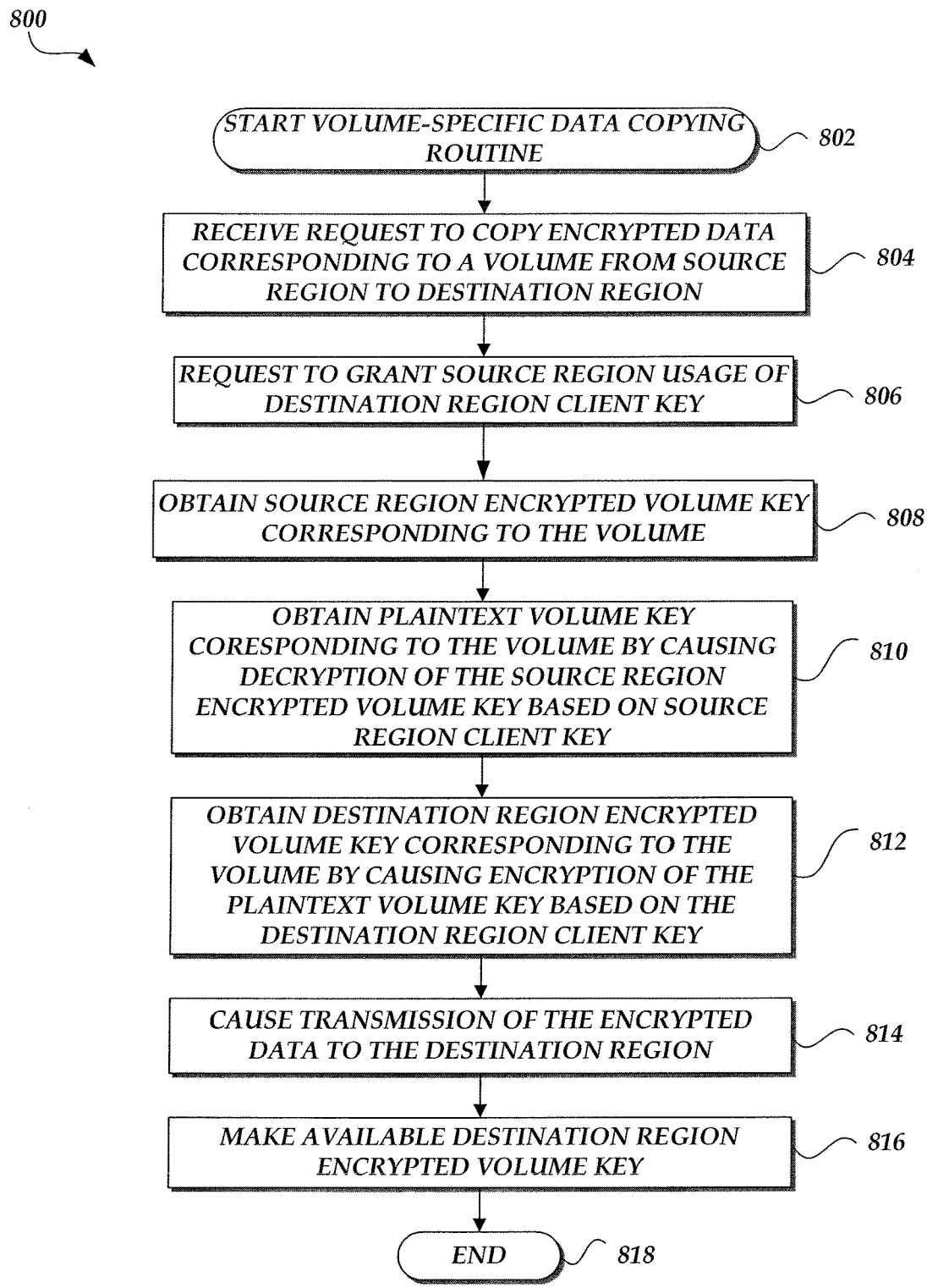
FIG. 8 is a flow diagram of an illustrative process to copy volume-specific data from a source region to a destination region.

FIG. 8 is a flow diagram of an illustrative process 800 to copy volume-specific ciphertext data 514' from a source region 501' to a destination region 501. Routine 800 can be implemented by one or more components of a service provider computer network 101, such as a source region storage management service 103, a destination region service provider system manager 112', a source region service provider system manager 112, or other components that can be envisioned by a person of skill in relevant art, depending on the architectural design of the service provider computer network 101.

As depicted in FIG. 8, routine 800 starts at block 802. At block 804, a request is received to copy ciphertext data 514' corresponding to a volume configured for managing encrypted data, from the source region 501' to the destination region 501. Illustratively, the request to copy volume-specific data may include metadata corresponding to the volume-specific data 514', such as a volume identifier, data descriptions, or snapshot identification information. The request may also include information related to an identification or authentication of a client associated with the volume. The request may further include information related to a virtual machine instance to which the volume, if established, can be attached.

At block 806, the destination region service provider system manager 112 requests a key management service 105 of the destination region 501 to grant an entity of the source region 501' (e.g., a storage management service 103') usage of a destination region client key managed by the destination region key management service 105. As describe earlier, this can be achieved by creating or updating a policy for utilizing a destination region client key associated with the client 111, so that the source region storage management service 103' is permitted to request encryption of a plaintext volume key associated with the snapshot using the destination region client key managed by the key management service 105 and to receive a destination region encrypted volume key that resulted from the encryption.

At block 808, source region encrypted volume key 512' corresponding to the volume is obtained. As described earlier, the source region encrypted volume key 512' corresponding to the volume can be obtained from a storage management service 103' in the source region 501'. In the case where the volume is established in the source region 501', the storage management service 103' may locate the source region encrypted volume key 512' in its volume records. In the case of copying a volume snapshot, the storage management service 103' can locate the encrypted volume key 512' based on a pointer or data structure corresponding to the snapshot 510'. There may exist multiple source region encrypted volume keys corresponding to the same volume in accordance with the source region 501'. The multiple encrypted volume keys which may have resulted from multiple API calls to a source region key management service 105' on different occasions. For example, a different encrypted volume key can be generated when a volume snapshot is generated. In this example, an existing encrypted volume key corresponding to the volume may be decrypted, and the resulting plaintext volume key may be encrypted again to generate a new encrypted volume key, which is a different in ciphertext than the existing encrypted volume key. This newly generated, different encrypted volume key can then be associated with volume snapshot data to form the snapshot.

At block 810, plaintext volume key corresponding to the volume is obtained via decryption of the source region encrypted volume key 512' based on the source region client key or its functional equivalent. As described earlier, decryption of the source region encrypted volume key 512' based on the source region client key or its functional equivalent can be achieved by the key management service 105' of the source region 501'. An applicable API call to the key management service 105' in accordance with an applicable policy for using the source region client key may cause the decryption, and in response, the plaintext volume key is returned. Alternatively, if an applicable decryption algorithm is available, the algorithm can be executed by another component of the service provider computer network 101 with the source region encrypted volume key 512', the source region client key or its functional equivalent, and possibly other parameters such as volume metadata as inputs, in order to generated the plaintext volume key.

At block 812, destination region encrypted volume key 512 corresponding to the volume is obtained via encryption of the plaintext volume key based on the destination region client key or its functional equivalent. As described earlier, encryption of the plaintext volume key based on the destination region client key or its functional equivalent can be achieved by the key management service 105 of the destination region 501. An applicable API call to the key management service 105 in accordance with an applicable policy may cause the encryption, and in response, the destination region encrypted volume key 512 is returned. Alternatively, if an applicable encryption algorithm is available, the algorithm can be executed by another component of the service provider computer network 101 with the plaintext volume key, the destination region client key or its functional equivalent, and possibly other parameters such as volume metadata as inputs, in order to generated the destination region encrypted volume key 512.

At block 814, the data 514' is caused to be transmitted to the destination region 501. As described earlier, this can be achieved by sending a data transmission request to the source region storage management service 103' with applicable metadata corresponding to the data 514'. The source region storage management service 103' may or may not delete the data 514' from the source region 501', depending on various embodiments. In these embodiments, if the data 514' is deleted from the source region 501', the source region encrypted volume key 512' may be deleted as well. In some occasions, however, the source region encrypted volume key 512' may be retained regardless of the logical existence of the data 514' in the source region. For example, key 512' may be retained for emergency or law enforcement needs in cases where data recovery is warranted. At block 816, the destination region encrypted volume key 512 is made available. In some embodiments, the destination region encrypted volume key 512 can be provided to the destination region storage management service 103 to enable establishment of the volume in the destination region 501. Alternatively, or in addition, the destination region encrypted volume key 512 can be associated with the data 514' received in the destination region 501 to form a new volume snapshot 510. Routine 800 ends at block 818.

While illustrative embodiments have been disclosed and discussed, one skilled in the relevant art will appreciate that additional or alternative embodiments may be implemented within the spirit and scope of the present invention. For example, the techniques described herein may be utilized, without departing from the scope of the present invention, to allow encrypted storage management in any number of other software applications and processes, including, but not limited to, image or video editing software, database software, office productivity software, 3d design software, audio and sound processing applications, etc. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with the scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable medium, may be stored in any number of computer executable components such as a CD-ROM, DVD-ROM, or provided or obtained via a network interface; further, components and/or data can be included in a single device or distributed in any other manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
   receiving a request for copying data from a source region comprising one or more first data storage servers to a destination region comprising one or more second data storage servers,
      wherein the one or more first data storage servers establish a data storage volume in the source region for storing data (i) generated by a virtual machine instance, and (ii) encrypted by an independent software process according to a plaintext volume key provided by a key management service;
      wherein the independent software process is executed independently of the virtual machine instance and receives, from the virtual machine instance, the data generated by the virtual machine instance, such that the virtual machine instance does not have access to the plaintext volume key and does not have access to an identifier of the plaintext volume key, and
      wherein the data storage volume is associated with a source region encrypted volume key that is generated by encrypting the plaintext volume key with a source region client master key associated with the virtual machine instance;
   obtaining, in response to the request for copying data, the source region encrypted volume key from the key management service;
   causing decryption of the source region encrypted volume key based, at least in part, on the source region client master key associated with the virtual machine instance, wherein the decryption results in the plaintext volume key;
   causing encryption of the plaintext volume key based, at least in part, on a destination region client master key associated with the virtual machine instance to obtain a destination region encrypted volume key;
   making the destination region encrypted volume key available in the destination region; and
   causing transmission, to the destination region, of the data (i) generated by the virtual machine instance, and (ii) encrypted by the independent software process.

2. The method of claim 1 further comprising causing establishment of the data storage volume in the destination region by the one or more second data storage servers, wherein establishment of the data storage volume in the destination region is based, at least in part, on the destination region encrypted volume key.

3. The method of claim 2, wherein the establishment of the data storage volume in the destination region by the one or more second data storage servers comprises:
   allocating storage space on the one or more second data storage servers for the data storage volume;
   storing, in the allocated storage space, the data (i) generated by the virtual machine instance, and (ii) encrypted by the independent software process; and
   associating the destination region encrypted volume key with the data storage volume in the destination region.

4. The method of claim 2 further comprising enabling access to the data storage volume in the destination region based, at least in part, on a decryption of the destination region encrypted volume key.

5. A system comprising:
one or more first computers including processors and memory corresponding to one or more first data storage servers, wherein the one or more first data storage servers form a data storage volume in a source region, wherein the data storage volume maintains data (i) generated by a virtual machine instance in the source region, and (ii) encrypted by an independent software process according to a plaintext volume key associated with the data storage volume, wherein the plaintext volume key is received from a key management service, wherein the virtual machine instance does not have access to the plaintext volume key and does not have access to an identifier of the plaintext volume key, and wherein the data storage volume is associated with a source region encrypted volume key that is generated by encrypting the plaintext volume key with a source region client master key associated with the virtual machine instance;
one or more second computers including processors and memory corresponding to one or more second data storage servers; and
one or more third computers including processors and memory, the memory including instructions that, upon execution, cause the one or more third computers to at least:
receive a request for copying, from the source region to a destination region comprising the one or more second data storage servers, the data (i) generated by the virtual machine instance in the source region, and (ii) encrypted by the independent software process;
obtain, in response to the request, the plaintext volume key associated with the data storage volume from the key management service;
cause the key management service to encrypt the plaintext volume key to generate a destination region encrypted volume key associated with a client, wherein the client is associated with the destination region; and
make available, to the destination region, the data (i) generated by the virtual machine instance in the source region, and (ii) encrypted by the independent software process, wherein the data (i) generated by the virtual machine instance in the source region, and (ii) encrypted by the independent software process is associated, in the destination region, with the destination region encrypted volume key.

6. The system of claim 5, wherein causing of the key management service to encrypt the plaintext volume key includes causing generation of an intermediate value usable by the key management service to generate the destination region encrypted volume key.

7. The system of claim 6, wherein making the data (i) generated by the virtual machine instance in the source region, and (ii) encrypted by the independent software process available to the destination region includes transmitting the intermediate value to the destination region.

8. The system of claim 5, wherein the memory of the one or more third computers includes instructions that, upon execution, further cause the one or more third computers to at least make the plaintext volume key available in the destination region.

9. The system of claim 8, wherein making the plaintext volume key available in the destination region is based, at least in part, on a decryption of the destination region encrypted volume key in the destination region.

10. The system of claim 5, wherein the plaintext volume key associated with the data storage volume is obtained based, at least in part, on a decryption of the source region encrypted volume key in the source region.

11. The system of claim 5, wherein the key management service generates the destination region encrypted volume key based, at least in part, on an encryption, in the destination region, of the plaintext volume key.

12. The system of claim 5, wherein the source region client master key is further associated with a client associated with the source region and a volume identifier associated with the data storage volume.

13. The system of claim 5, wherein the memory of the one or more third computers includes instructions that, upon execution, further cause the one or more third computers to at least make the plaintext volume key available in the destination region based, at least in part, on an update to a key access policy with respect to the client associated with the destination region, wherein the update is associated with the request for copying data.

14. The system of claim 5, wherein the instructions further cause the one or more third computers to cause establishment of the data storage volume in the destination region based, at least in part, on the destination region encrypted volume key.

15. The system of claim 5, wherein the memory of the one or more third computers includes instructions that, upon execution, further cause the one or more third computers to at least receive pre-authenticated information provided by the client associated with the destination region, and wherein obtaining the plaintext volume key comprises causing decryption of the source region encrypted volume key based, at least in part, on processing the pre-authenticated information.

16. Non-transitory physical computer storage comprising computer-executable instructions that, when executed, direct a computing system to at least:
receive, at a local region comprising one or more data storage servers, a first request for copying data corresponding to a first data storage volume, wherein the first data storage volume maintains, in a remote region, the data corresponding to the first data storage volume, wherein the data corresponding to the first data storage volume is encrypted by an independent software process associated with the remote region according to a plaintext volume key received from a key management service, wherein the remote region comprises one or more other data storage servers, and wherein:
the data corresponding to the first data storage volume is received in a plaintext form from a virtual machine instance and stored in a first ciphertext form associated with a remote region key in the remote region, the remote region key being associated with the virtual machine instance, and
the independent software process is executed independently of the virtual machine instance such that the virtual machine instance does not have access to the plaintext volume key and the remote region key, and does not have access to an identifier of the plaintext volume key or an identifier of the remote region key;
generate, at the local region and in response to the request for copying the data corresponding to the first data storage volume, a request to the remote region to initiate copying of the data corresponding to the first data storage volume, wherein the request to initiate copying of the data corresponding to the first data storage volume includes pre-authenticated information provided by the virtual machine instance; and receive, at the local region, the data corresponding to the first data storage volume and stored in the first ciphertext form from the remote region.

17. The non-transitory physical computer storage of claim 16, wherein the computer-executable instructions further direct the computing system to at least establish a second data storage volume in the local region based, at least in part, on the received data corresponding to the first data storage volume.

18. The non-transitory physical computer storage of claim 16, wherein the computer-executable instructions further direct the computing system to at least:

create a permission allowing a component in the remote region to perform encryption with respect to a master key in the local region; and receive a local region key encrypted under the master key in the local region.

19. The non-transitory physical computer storage of claim 16, wherein the computer-executable instructions further direct the computing system to at least obtain a local region key associated with the received data corresponding to the first data storage volume.

20. The non-transitory physical computer storage of claim 16, wherein the data corresponding to the first data storage volume is a snapshot of the first data storage volume.

* * * * *